United States Patent
Dartez

(10) Patent No.: US 11,912,600 B2
(45) Date of Patent: Feb. 27, 2024

(54) MIXER FOR PONDS AND OTHER SHALLOW BODIES OF WATER

(71) Applicant: James Dartez, New Orleans, LA (US)

(72) Inventor: James Dartez, New Orleans, LA (US)

( * ) Notice: Subject to any disclaimer, the term of this patent is extended or adjusted under 35 U.S.C. 154(b) by 58 days.

(21) Appl. No.: 16/181,775

(22) Filed: Nov. 6, 2018

(65) Prior Publication Data

US 2020/0140306 A1 May 7, 2020

(51) Int. Cl.
*C02F 7/00* (2006.01)
*B01F 23/231* (2022.01)
*C02F 103/00* (2006.01)
*B01F 101/00* (2022.01)

(52) U.S. Cl.
CPC .......... *C02F 7/00* (2013.01); *B01F 23/23121* (2022.01); *B01F 23/231231* (2022.01); *B01F 23/231265* (2022.01); *B01F 2101/305* (2022.01); *C02F 2103/007* (2013.01); *C02F 2201/009* (2013.01)

(58) Field of Classification Search
CPC ........ B01F 3/04248; B01F 2003/04319; B01F 2003/04361; B01F 2215/0052; B01F 23/23121; B01F 23/231265; B01F 23/231231; B01F 2101/305; C02F 7/00; C02F 2103/007; C02F 2201/009
USPC .................................. 261/30, 120, 123, 124
See application file for complete search history.

(56) References Cited

U.S. PATENT DOCUMENTS

| | | | | |
|---|---|---|---|---|
| 4,273,731 A * | 6/1981 | Laurie | .................. | A01K 63/042 261/124 |
| 4,474,714 A * | 10/1984 | Downs | ................ | B01F 3/04262 210/221.2 |
| 4,564,447 A * | 1/1986 | Tiedemann | .......... | B01D 17/048 210/220 |
| 5,032,325 A * | 7/1991 | Tharp | .................. | B01F 3/04262 261/124 |
| 6,893,484 B2 * | 5/2005 | Thomas | ............. | B01D 53/1456 261/123 |
| 7,874,548 B1 * | 1/2011 | McGuffin | ............ | B01F 3/04517 210/242.2 |
| 8,016,273 B1 * | 9/2011 | Dartez | ................ | B01F 3/04113 261/120 |
| 8,894,048 B2 * | 11/2014 | Cai | ...................... | B01F 3/04248 261/121.1 |
| 9,260,333 B2 * | 2/2016 | Dartez | ...................... | C02F 7/00 |
| 2002/0104807 A1 * | 8/2002 | Keeton, Jr. | ........ | B01F 15/00519 210/620 |
| 2011/0272831 A1 * | 11/2011 | Pearson | ................ | B01F 3/0412 261/120 |
| 2013/0214437 A1 * | 8/2013 | Al-Anzi | ..................... | C02F 3/20 261/30 |

* cited by examiner

*Primary Examiner* — Charles S Bushey
(74) *Attorney, Agent, or Firm* — Kenneth L. Tolar

(57) ABSTRACT

A mixing apparatus is disclosed for ponds and other shallow bodies of water. The apparatus uses air flow to entrain and move large volumes of water up and through the mixer. This movement of water creates a mixing of water from different depths within the body of water, and thus prevents, eliminates, or reduces stagnation of the water. The air flow is driven by one or more blowers, which may be mounted on the apparatus. The air from the blower is injected into the water about one to two feet below the surface. The air is injected through a series of relatively large holes positioned on opposed sides of tubing. The injected air creates water flow in sufficiently large volumes to mix the water within a shallow body of water of moderate size.

10 Claims, 3 Drawing Sheets

MIXER FOR PONDS AND OTHER SHALLOW BODIES OF WATER

BACKGROUND OF THE INVENTION

1. Field of the Invention

This invention relates to a mixer for ponds and other shallow bodies of water such as retention ponds, farm ponds, waste water collection reservoirs and the like. In a preferred embodiment, the invention utilizes a blower to force air flow into the water in a manner that creates a large volumetric flow of water through the mixer.

2. Description of Related Art

A variety of devices are used in ponds or other bodies of water to aerate the water. In-pond aerators are one example of such a device, and in-pond aerators have been used in a variety of contexts. The terms "in-pond aerator" are used herein to refer to any aerator positioned within a body of water, whether the body of water is technically a pond or other type of reservoir. Thus, an in-pond aerator is any type of aerator positioned in any body of water to aerator the water.

In-pond aerators are often used in aquaculture, for example, to oxygenate the water body in order to provide optimum conditions for the fish or other living organisms being produced. Aerators of this type are also used in waste collection and treatment, because sufficient oxygen is needed in these operations to facilitate the breakdown of the waste. Without aeration, many small to mid-sized bodies of water become stagnant, with low dissolved oxygen levels, increasing amounts of sludge build-up, and other related problems. These poor conditions can lead to a variety of problems, including fish kills, emissions of undesirable gases and odors, and an accumulation of sludge. Aerators of many kinds have been used to introduce oxygen into such bodies of water.

An improved aerator is disclosed and claimed in U.S. Pat. No. 8,016,273 to Dartez (the '273 patent). The '273 patent is hereby incorporated by reference, and certain structural features of the aerator design disclosed in the '273 patent serve as a starting point for understanding the operation of the present invention. But where the '273 patent disclosed an aeration device that used multiple diffusers—that is, tubing with many, very small, holes—to fully aerate the water, the present invention is not primarily an aerator. The present invention is a mixer. It moves a large volume of water to prevent stagnation. During the process of moving the water, aeration occurs, but this aeration is a secondary consequence of the use of the present invention. Indeed, the two inventions share the concept of using air to aerate or move water, but the inventions differ substantially in other respects.

The aerator disclosed in the '273 patent uses diffuser tubes. These tubes either contain a large number of small holes, or consist of air permeable materials that allow flow of air outward along the entire length of the material. For example, neoprene material may be used as diffusers in the '273 patent. Neoprene, when wet, is permeable to air. A neoprene diffuser may include a section of PVC tubing with many holes in it covered with a neoprene sleeve. The neoprene sleeve effectively creates a length of tubing with hundreds or thousands of points of air flow. The air flows through the permeable material in many very small streams, and the result is a blanket of tiny air bubbles exiting the diffusers.

This structure works well for an aerator because the very small bubbles created by the fine diffusers are absorbed well by the water being treated. By injecting an almost countless number of tiny air bubbles into a moving stream of water, the dissolved oxygen content of the water is increased substantially. This structure and method works quite well for aeration of fish ponds or waste treatment ponds.

In this prior art aerator configuration, a suitable combination of coarse and fine diffusers works well. The fine diffusers cause the aeration of the water as explained above. The coarse diffusers, on the other hand, generate the flow through the device. These diffusers have holes of perhaps $1/16$ or $1/32$ of an inch in diameter. The bubbles created are larger than those created by the fine diffusers, but are not very large. These "larger" bubbles generated by coarse diffusers are not as readily absorbed by the flowing water. Instead, most of the larger bubbles quickly reach the surface of the water and release their enclosed air back into the atmosphere. But the injection of a steady stream of relatively large bubbles into the lower region of the device will result in substantial flow of water through the device. The larger bubbles entrain the liquid and move it.

Indeed, the prior art aerator works well when the coarse diffusers are inside the structure, and the fine diffusers are outside the structure. A structure somewhat similar to this is shown in FIG. 2, which is an alternative embodiment of the present invention. When an aerator is configured in this way, the coarse diffusers generate a large flow of larger air bubbles that quickly rise. These bubbles reach the angled of curved internal baffle plate of the device, which directs them forward and out of the device. In this way, the larger air bubbles leave the device with both upward momentum (due to the buoyancy of the bubbles) and forward momentum.

In this configuration, the fine diffusers are positioned outside and forward (i.e., in the direction the larger air bubbles are moving) of the main structure. This arrangement results in a blanket of very small air bubbles below the larger air bubbles. This tends to both move the small bubbles along and keeps them in the water longer, which increases the amount of air absorbed by the water. So this configuration does two things. It uses larger bubbles to generate water movement through the device, and it uses smaller bubbles to better aerate the water.

In the process of ongoing research and development of the type of aerator disclosed in the '273 patent (and described briefly above), it was unexpectedly discovered that a substantially different diffuser configuration could be used to obtain a much higher flow rate through the device. This result is not necessary for the aerator design discussed above, and might be undesirable in such a design. In the aerator, it is desirable to generate a sufficient flow of water through the device to keep the released stream of small bubbles moving. But if the flow rate is increased too much, a great deal of turbulence may be created. That might result in the rupture of many of the small bubbles before they are absorbed by the water. Based on experience and testing, it is believed that a "sweet spot" of flow rate works best for an aerator, and that flow rate should not be too great or too small.

The current invention is a mixer that generates a very high flow rate through the device, a flow rate that is probably too high for most aerator applications. Indeed, the present invention can create a flow rate that is a multiple of that achievable using the prior art aerator design. Such large flow rates may not be best of aeration, but they will result in greater mixing of the body of water. By pulling more water into the device, water is pulled from regions farther away from the device. This includes pulling water from deeper in the body of water. In addition, the water exiting the device is moving faster and, therefore, will travel farther. This also causes more mixing of the water.

If a sufficient flow rate is achieved, a device of this type can effectively mix almost all the water in a pond or other body up to about ten feet in depth. This result can be extremely beneficial in certain settings. Retention ponds, for example, are typically less than ten feet deep. These ponds often become stagnant, with sediment forming along the bottom of the ponds and algae or other materials covering the surface. Such ponds can become both visual and smelly nuisances. What is needed is an economical way to mix the water in such ponds. Mixing the water would eliminate the stagnation and also provide sufficient aeration to allow for healthy processes to occur. In effect, the mixing described here is a process of turning over the pond, that is, of moving the sediment-filled lower parts of the pond to the surface and vice versa. The present invention produces just such a result.

In the present invention, the coarse diffuser is replaced by a single set of large tubes. In a preferred embodiment, the tubes are rectangular and made of stainless steel or some other suitable material. Larger holes—one-quarter inch diameter in a preferred embodiment—are drilled into one side of each tube so that the holes in adjacent tubes face each other. This configuration is explained in greater detail below. It differs in two key respects from the coarse diffusers of the prior art aerator design: the holes are much larger (by at least a few orders of magnitude); and, the holes are positioned as pairs of directly-opposed holes.

It was discovered that using large holes aligned in an opposed manner created a very large increase in water flow. Indeed, the present mixer will move at least twice as much water with half the injected air. It is hard to overstate the significance of this unexpected result. A mixer of the present invention using a single blower can move twice as much water as an aerator of the prior art design that has two or three blowers. That will decrease the power requirements by two or three times. By doubling the flow and cutting the power needs by half or more, the present invention becomes useful in an entire range of applications that could not be effectively served by the prior art aerator device.

For example, the present invention may reduce the power needs to the point that on-site solar power is a viable option. In other words, a self-contained pond mixer can be made using the present invention that is powered entirely by solar panels on the mixer itself. No external power source would be needed. In this configuration, the mixer may not operate all the time, due to weather and the normal night/day cycle. But this may not matter, because even operating the invention a few hours each day will be sufficient to effectively mix the contents of many ponds or other small bodies of water. This configuration is not only self-contained, but is self-regulating, requiring very little oversight.

In many settings, mixing the water is more important than aeration. Indeed, in some settings, there is sufficient oxygen in much of the existing water. The water with the oxygen, however, may not be in contact with the waste material or other material that needs the oxygen. This is often true in stagnant ponds. There is some oxygen, but it isn't being effectively used. Mixing solves this problem. In addition, by using air flow to produce the mixing, the dissolved oxygen content of the water is also increased.

If the flow volumes generated by the present mixer are desired and increased aeration is needed, the novel mixing structured disclosed herein may be combined with a set of fine diffusers of the type disclosed in the '273 patent. Such a configuration would move much more water than the aerator of the '273 patent, but would inject fine bubbles, too. This combination is not expected to be the norm, but it is possible, as is shown and explained more below.

The present pond mixer may also be used in cold conditions, by adding the features disclosed in U.S. Pat. No. 9,260,333, which is also incorporated by reference. The '333 patent discloses a structure for generating a stream of air bubbles around three sides of the structure's housing, wherein this action creates turbulence and prevents the water from freezing. This feature can be added to the pond mixer disclosed herein to facilitate use in below-freezing conditions.

OBJECTS AND SUMMARY OF THE INVENTION

It is an object of the invention to provide a pond mixer for mixing the water in a pond or other relatively small body of water. The present invention is expected to be of maximum benefit in water bodies of up to a few acres in size. Multiple mixers can be used on larger water bodies. The present invention employs a blower, ducts, connections, and bubbling tubing. The blower is connected to ducts, which route the output of the blower to the bubbling tubing, which is installed below the waterline of the water body.

DETAILED DESCRIPTION OF THE INVENTION

Figure 1:
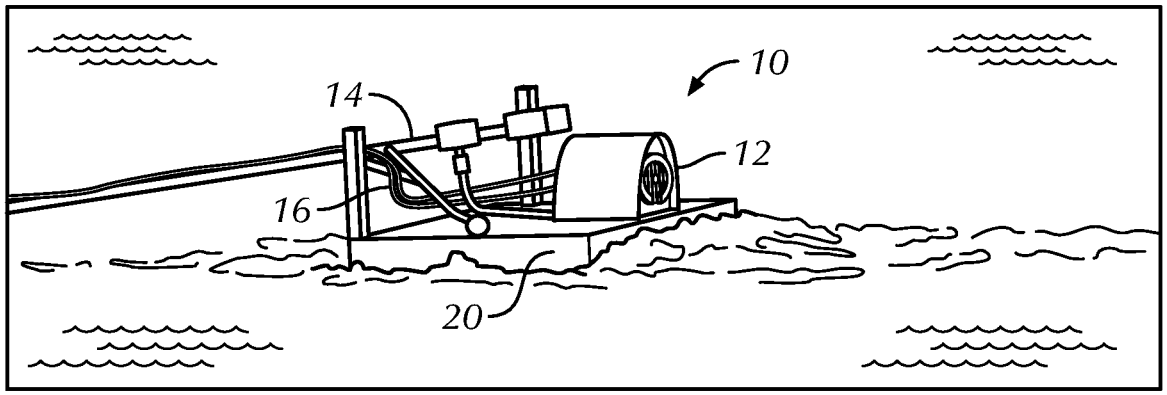
FIG. 1 is perspective view sketch of an embodiment of the present invention in use.

The following description makes reference to the drawings and the item numbers shown in those drawings. FIG. 1 shows a sketch of a pond mixer 10 in use. The mixer 10 may have one or more blowers 12 that provide the needed airflow to the mixer tubing. A single blower 12 is shown in FIG. 1, and that is all the present invention requires for most situations. If additional features are included—such as the fine diffusers shown in FIG. 2 and discussed below, or anti-icing tubing—then additional blowers 12 may be needed.

This mixer is of the same general structure and layout disclosed in the '273 patent, though it is not limited to that design. In preferred embodiments, the pond mixer 10 has a solid back and two solid sides, with an open front. The open front is below the water level in FIG. 1, and it is through this large opening that the water flows, as will become clear in the following discussion. The general depiction of the invention in FIG. 1 shows a shore support beam 14, which may be made of PVC tubing or any other material that provides sufficient strength and rigidity to support electrical lines 16, which provide power from shore to the mixer 10. The support beam 14 may also be used to move the mixer 10 or keep it stationary.

Figure 2:
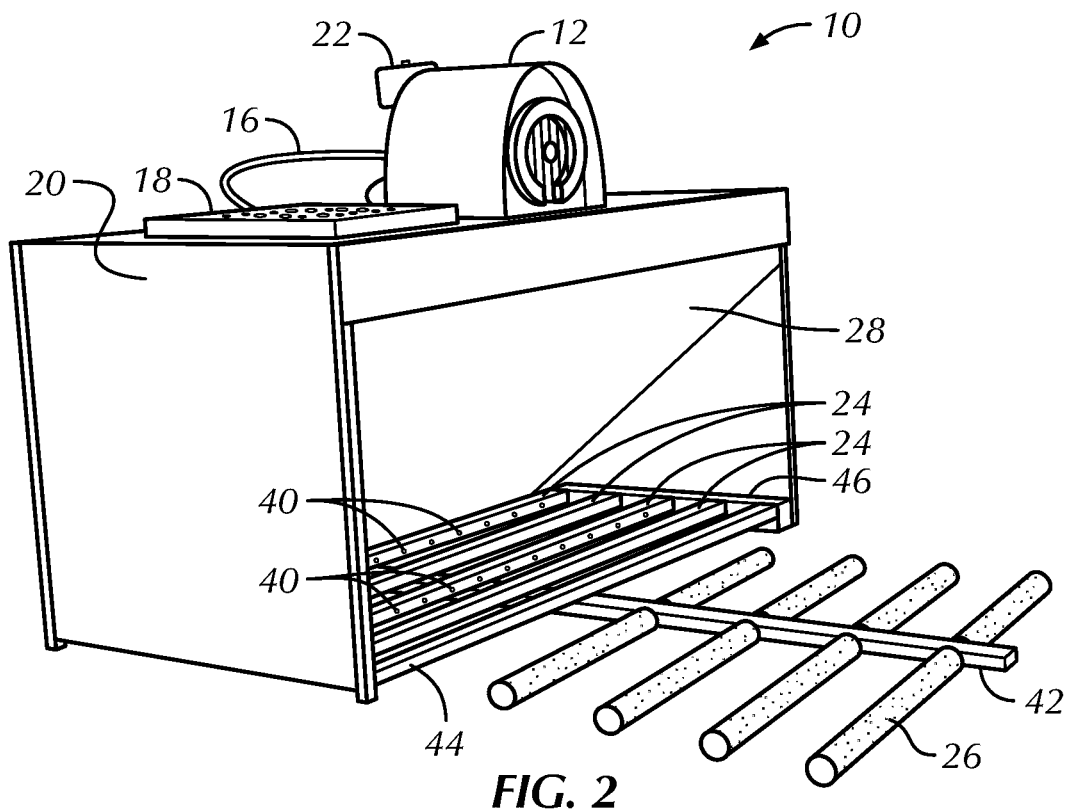
FIG. 2 is a perspective view of an alternative embodiment of the present invention that includes a set of fine diffusers in addition to the pond mixer structure.

FIG. 2 shows the mixer 10 out of the water and from a position forward and to the side of the unit. This view allows presentation of some of the key structural components of the mixer 10, including the blower 12 and the housing 20. FIG. 2 also shows two optional features: a solar panel 18 (connected to the blower 12 via electrical lines 16) and a set of fine diffusers 26. The use of the fine diffusers 26 is explained in the '273 patent and will not be repeated in detail here. Suffice it to say these fine diffusers 26 may be used to generate fine bubbles in the area immediately in front of the mixer 10. The water flow generated by the mixer 10 will move above the fine bubbles. This optional feature may be used with the mixer 10 to increase the aeration of the water body.

Within the lower area of the housing 20 are the mixer tubes 24 which contain a series of opposed air outlets 40. These outlets 40 are holes, and in a preferred embodiment, they are approximately ¼" diameter round holes. The outlets 40, however, may be of any convenient shape. They outlets 40 may be square, rectangular, triangular, oval, or an irregular shape. The outlets 40 must be relatively large so that a large volume of air flows through them. Sizes here are relative and the context is that disclosed in the '273 patent. The fine diffusers disclosed in that patent have very small holes, possibly smaller than the naked eye can see. The large or coarse diffusers disclosed in the '273 patent have holes that are typically ¹⁄₁₆" in diameter or less. The outlets 40 used in the present invention are at least 2-3 times larger than the largest holes used in the coarse diffusers of the '273 patent.

The use of such large holes was not expected to produce good results. The aerator disclosed in the '273 patent works quite well and produces a substantial flow rate. It was believed that increasing the size of the coarse diffusers would either produce less flow or possibly the same as that achieved by the design of the aerator of the '273 patent. In that aerator, the coarse diffusers have holes spaced along their lengths and in random directions. Air exiting the coarse diffusers of the '273 patent, therefore, tend to blanket the diffuser tubes just before they begin the rise and exit the aerator housing. It was expected that using larger holes in the coarse diffuser would result in degeneration of the many bubbles created by the coarse diffuser.

That is the structure of the present mixer 10. A typical mixer tube 24 of the present invention may have 10-12 air outlets 40 along one side of the tube, with no additional outlets provided in the tube. The coarse diffusers of the '273 patent, on the other hand, may have 50 or 100 or more much smaller holes arranged all along and around the coarse diffuser tubing. The structural difference in quite striking, and the resulting flow rate is also quite different. By injecting a much larger stream of air at fewer points, and by injecting mutually opposed air streams, the present mixer 10 produces flow rates that are twice or more that achieved by the aerator of the '273 patent. This result was unexpected, but may be highly beneficial in certain settings, as explained above.

The optional fine diffusers 26 are not expected to be used in most applications. When the high flow of the mixer 10 is needed, maximum aeration is likely a secondary concern. And the mixer 10 will create a good deal of aeration simply by the injection of so much air into the water and by moving and mixing that water. But if additional aeration is desired, the present invention can add a set of fine diffusers 26, as illustrated in FIG. 2. These diffusers are supported by an extended diffuser tube mid support beam 42. A mixer tube front support beam 44 is also shown in FIG. 2.

The optional solar panel 18 may be used to power the blower 12 so that the mixer 10 may be used in a remote location or in any location without the need for an external power source. This capability is possible because the enhancement of the flow rate with the present design is so great that a single blower can generate sufficient flow rate in many settings. With a single blower, it is possible, again in some situations, to use solar panels 18 to power the blower. The housing of the present invention is relatively large, which provides enough upper surface area for a number of solar panels 18. The maximum mixing and flow rate attainable with the present invention may not be possible using solar power, but in some settings this may not matter. An alternative embodiment of the invention, powered by one or more solar panels 18, may be highly beneficial in certain settings. Indeed, for many remotely located sites, such a configuration may be the only viable option for mixing and aerating the water body.

Figure 3A:
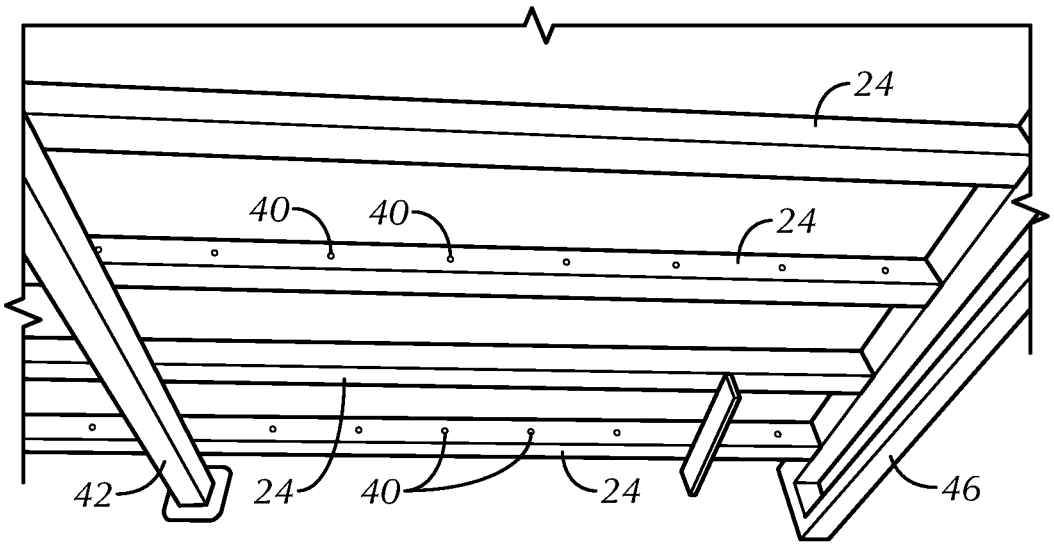
FIG. 3A is a bottom side view of a portion of the pond mixer tubing used in a preferred embodiment of the present invention.
Figure 3B:
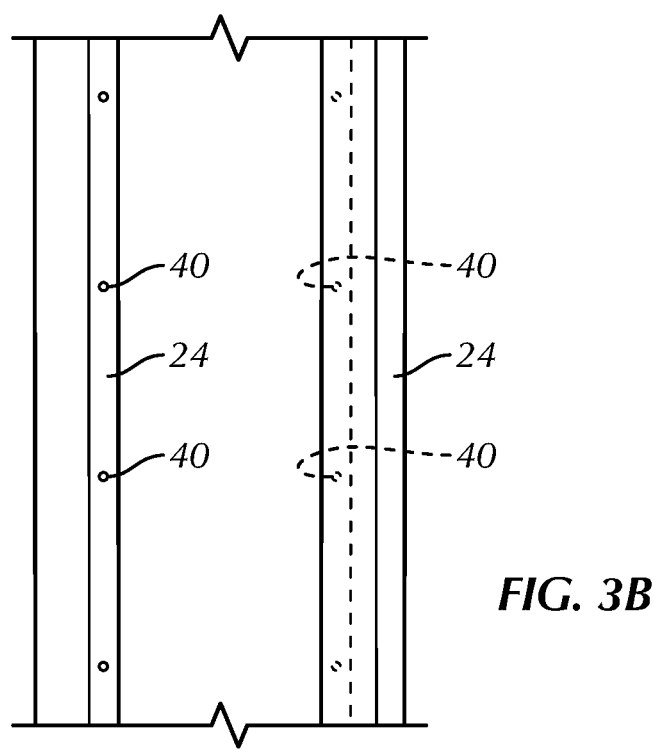
FIG. 3B is a top view from an angle of portions of two pond mixer tubes of an embodiment of the present invention.

The physical structure of the mixer portions of the present invention are better understood through FIGS. 3A and 3B. In FIG. 3A, the mixer tubes 24 are seen apart from the housing 20 and from a position below and just forward of the tubing assembly. The tubing mid support beam 42 and the tubing side supports 46 are shown, with the mixer tubes 24 supported by both. The side supports 46 in a preferred embodiment are also conduits and support air to the mixer tubes 24. The air outlets 40 can be seen on one side of alternate mixer tubes 24, which illustrates an important feature of the present invention. Not only do the mixer tubes 24 have outlets 40 on a single side, but alternating mixer tubes 24 have outlets 40 on different sides. The outlets 40 of a pair of mixer tubes 24 are mutually opposed. For that reason, the outlets 40 are only visible on every other mixer tube 24 from the perspective shown in FIG. 3A.

In FIG. 3B, however, the mutually opposed nature of the air outlets 40 is better shown. The outlets 40 in the mixer tube 24 on the left side of the drawing are visible, in the same manner as the outlets 40 shown in FIG. 3A. The corresponding and mutually opposed air outlets 40 in the mixer tube 24 on the right side of FIG. 3B are shown in dashed lines because these outlets 40 are present but not visible from the perspective of FIG. 3B.

Figure 4:
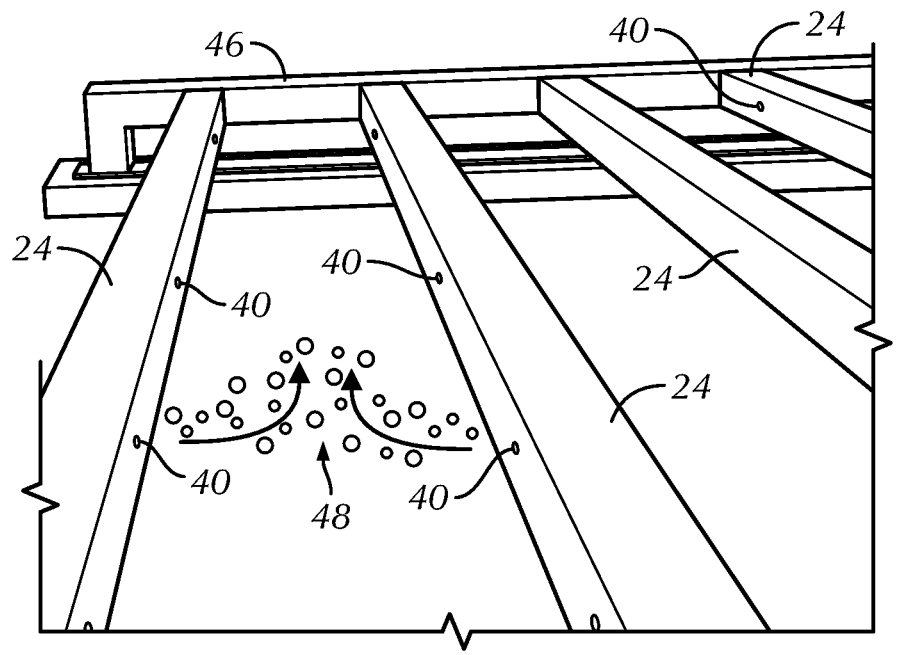
FIG. 4 is a perspective view of a portion of the pond mixer tubes of an embodiment of the present invention, with a simulated air flow shown exiting a pair of pond mixer air outlets.

To further illustrate this configuration and its results, FIG. 4 shows a perspective view of a pair of mixer tubes 24 from a position just above and between the tubes. From the position, it is possible to see the outlets 40 of both mixer tubes 24. These outlets 40 are positioned so that air exiting a pair of opposed outlets 40 will collide in the area between the mixer tubes 24. This is shown by the simulated air flow 48 from one pair of such opposed outlets 40. It is believed that the combination of the large outlets 40 and the opposed positioning of the outlets 40 produces the unexpectedly large increase of water flow produced by the present invention.

In a preferred embodiment, the outlets 40 are positioned about every 6-12" along each mixer tube 24. Every mixer tube 24 has outlets 40, but all such outlets are arranged in the mutually opposing manner described above. Even larger outlets 40 may be used, but if larger holes are used, fewer outlets should be used. It has been found that when very large holes (e.g., ½" or larger), only a small number of outlets 40 should be used in each mixer tube. If too many large air outlets 40 are used, a single blower will not produce enough air flow to maximize the air through all the outlets.

It is possible to determine the optimum number and size of the outlets 40. This is best done through experimentation, but in general a single blower will adequately supply about 50-60 ¼" air outlets in accordance with the present invention. If larger outlets are used, the number of outlets should be reduced so that the total air outlet surface area is maintained approximately constant. For example, in the preferred embodiment with 60 ¼" outlets, the total surface area is approximately three square inches.

In use, the air flow 48 leaving the air outlets 40 rises within the housing 20 until it reaches the baffle plate 28. The baffle plate 28 may be a flat panel installed at an angle as shown in FIG. 2, which has a baffle plate with an angle of about 45 degrees. A different angle, preferably between 30 degrees and 60 degrees, may be used with a flat plate, or a baffle plate 28 with a curved surface may be used. The purpose of the baffle plate 28 is to redirect the air flow from our air outlets 40 toward the open front side of the housing 20. This air flow entrains water and consequently pulls water into the housing 20 from the area below the mixer 10, and then moves that water out through the open front side of the housing 20. By moving a large volume of water, the mixer 10 is able to thoroughly mix the water is in a pond or other water body of appropriate size and depth. The invention is effective at mixing water bodies of up to about 10' in depth. In deeper bodies of water, some movement of water below 10' is achieved, but the mixing is incomplete at such depths. The invention, however, may be useful in deeper water bodies because mixing the upper 10' of the water may provide benefit.

Figure 5:
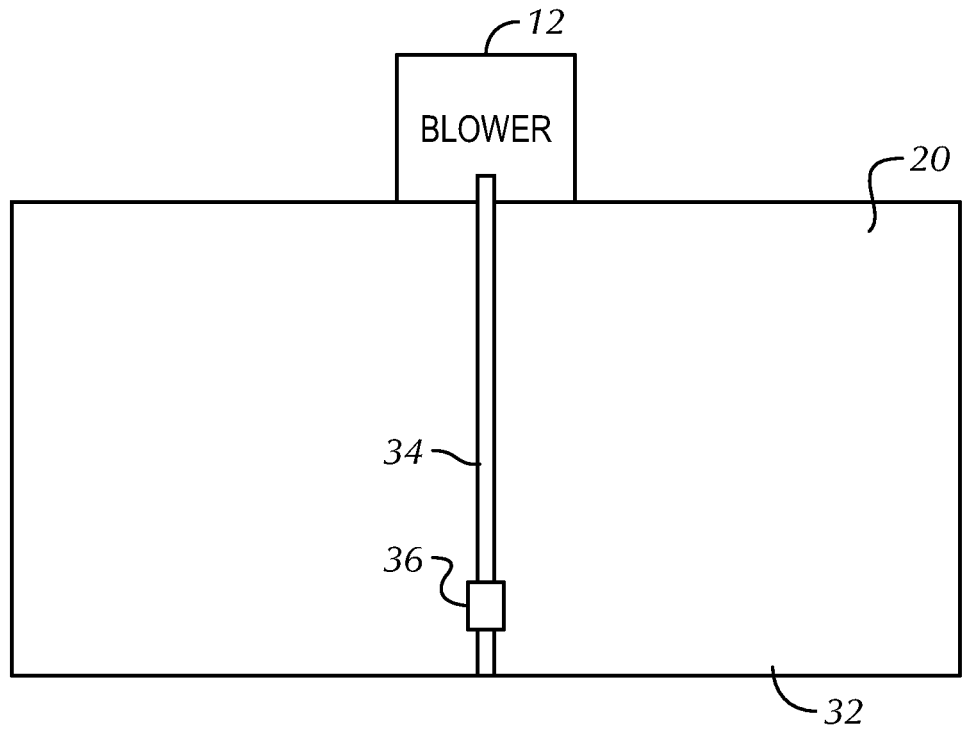
FIG. 5 is a back view of an embodiment of the present invention.

FIG. 5 shows a back view of the invention housing 20, the blower 12 and an air conduit 34. There is also shown an optional air handler 36 located near the lower end of the back side of the housing 32. This air handler can be used to optionally supply air flow to a ring of anti-icing tubing, like that disclosed in the '333 patent, or to fine diffusers like those shown in FIG. 2 and disclosed in the '273 patent. The air handler may include gates or other mechanisms to selectively direct air flow to either anti-icing tubing, fine diffusers, or any other suitable use. If the invention is made purely as a pond mixer, the air handler 36 is not needed any may be omitted. Other variations are also possible and are fully within the scope of the present disclosure.

I claim:

1. A pond mixer, comprising:
   a housing having a top, two solid sides, a solid back, an open front side, an open bottom, and a baffle plate extending from near an upper end of the open front side to near a lower end of the solid back;
   a blower;
   at least two pairs of mixer tubes, wherein each of said two pairs of said mixer tubes have first and second tubes, each of the first and second tubes having a plurality of air outlets, wherein the air outlets on the first tube are mutually opposed to the air outlets on the second, wherein a first of said at least two pairs of mixer tubes is adjacent a second of said at least two pairs of mixer tubes with no intermediary structures therebetween, and wherein the air outlets of the first of said at least two pairs of mixer tubes and the second of said at least two pairs of mixer tubes are only on a side facing an adjacent one of said tubes to produce a higher volume of air flow through said housing; and,
   an air conduit connecting the blower to the pairs of mixer tubes.

2. The pond mixer of claim 1 wherein each of said mixer tubes has 6-10 air outlets.

3. The pond mixer of claim 2 wherein each air outlet is spaced at least 6", but less than 12", from every other adjacent air outlet in the same mixer tube.

4. The pond mixer of claim 3 wherein there are no more than 60 air outlets.

5. The pond mixer of claim 1 wherein the air outlets are generally circular and approximately ¼" in diameter.

6. The pond mixer of claim 1 further comprising mixer side beams, a mixer mid support beam and a mixer front support beam.

7. The pond mixer of claim 6 wherein the mixer side beams are also air conduits providing an air flow path from the blower to the mixer tubes.

8. The pond mixer of claim 1 further comprising a set of fine diffusers positioned outside and forward of the mixer housing.

9. The pond mixer of claim 1 further comprising a solar panel electrically connected to the blower.

10. The pond mixer of claim 1 wherein the mixer tubes are rectangular in cross section.

\* \* \* \* \*